July 25, 1961   J. J. PROHASKA   2,993,429
AUTOMATIC PROPORTIONING DEVICE
Filed June 3, 1958
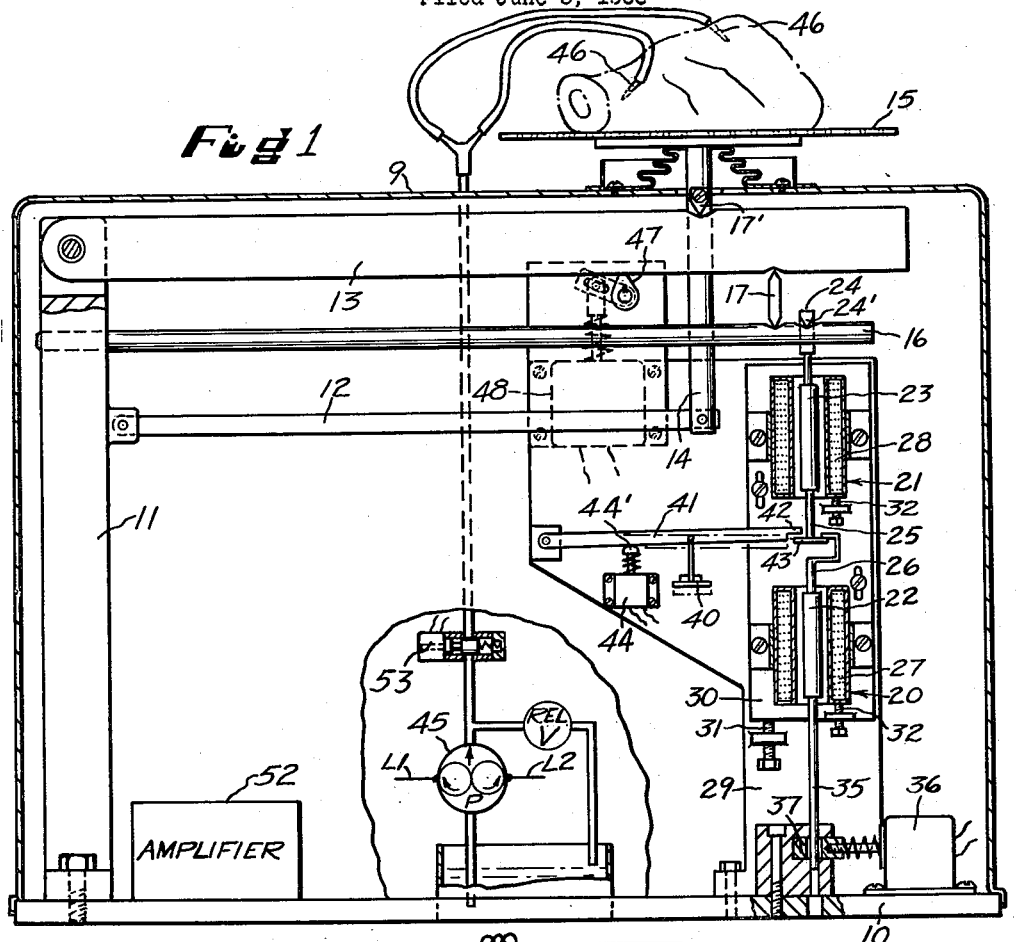
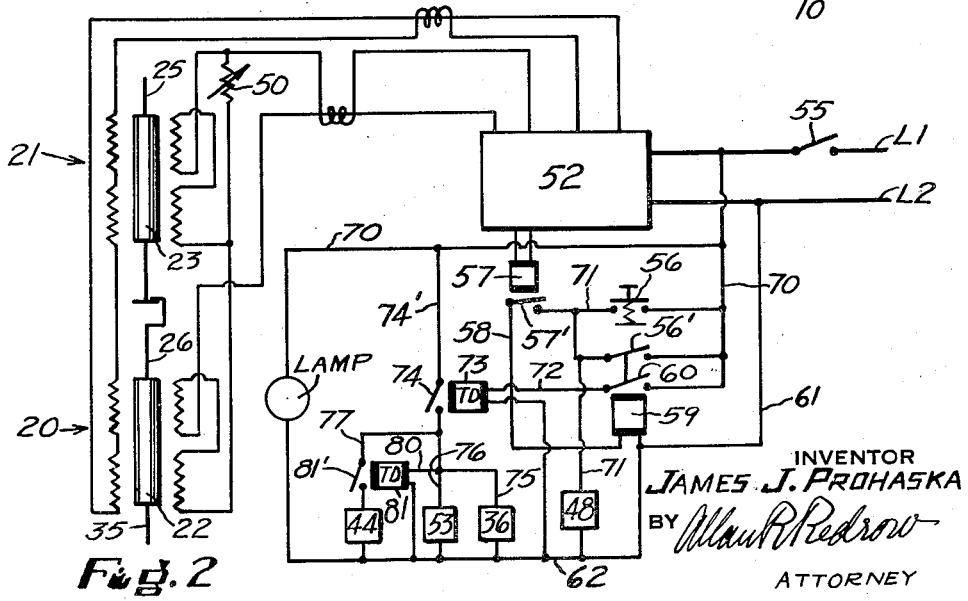
INVENTOR
JAMES J. PROHASKA
BY
ATTORNEY

United States Patent Office 2,993,429
Patented July 25, 1961

2,993,429
AUTOMATIC PROPORTIONING DEVICE
James J. Prohaska, 5234 W. 26th St., Cicero 50, Ill.
Filed June 3, 1958, Ser. No. 739,519
1 Claim. (Cl. 99—257)

This invention relates to a weighing means and more particularly to an automatic weighing device such as may be used to control the addition of one material to a base material in a given proportion to the weight of the base material.

A typical use for the herein disclosed apparatus is in the meat packing arts, where in following a well established practice, a curing pickle solution is pumped into a fresh ham product prior to the cooking and smoking steps and this is accomplished by pumping the desired solution under pressure through needles inserted into the veins and at spaced points directly into the fleshy portions of the produce. The pickle solution is supplied to the needles under a considerable pressure and is thus quickly caused to be dispersed substantially evenly throughout the product. The amount of pickling fluid added to the product is carefully controlled and is measured out in proportion to the weight of the product to produce uniformity throughout all of the several pieces of the product being treated. Various means have been proposed in the past to accomplish this ham weighing and proportional pumping operation automatically and the present invention provides an improvement in this art.

The device of this invention is adapted to be used with any type of weighing mechanism in which an appreciable movement is produced in some element of the mechanism used in weighing the product and wherein the movement is proportional to the weight of the particular product placed in the scale pan. This movement is utilized to actuate the herein disclosed mechanism which includes a "memory" device adapted to be initially indexed upon weighing the produce and a second device which may be set to measure the desired percentage differential with respect to the initial indication recorded at the "memory" device. Once the initial weight of a ham for example, has been determined, the operation of pumping the product may proceed under the control of the herein disclosed mechanism and pickle is pumped into the product until the percentage differential recorded in the second device has been balanced out. Once the product has been initially weighed and the "memory" device has been set, the reading of the second device may be automatically compared with the memory device during the pickle pumping operation and the apparatus is designed to automatically terminate the pumping operation where the percentage differential in their respective indications has been balanced out. Thus, a given quantity of pickle may be quickly dispensed in exact proportion to the weight of the product being treated.

For this purpose it has been found that a pair of transducer means or in other words a differential transformer transmitter means may be associated with any conventional scale device having a movable scale pan or other movable element. As here taught both of the transducer elements are adjusted to have a zero setting where no signal is generated when the scale pan is empty. One transducer may then be rendered operative to generate a signal having an amplitude and phase definition directly proportional to the weight of the product when it is weighed initially, and a second transducer is adapted to be actuated by the scale and connected into a circuit such that it will generate a signal having an amplitude and phase definition which is a given percentage different from that of the first transducer. Thereafter the armature of the one of the transducers generating the signal having the greater amplitude may be locked against further movement to form a "memory" device, whereupon pumping of a pickle solution into the ham on the scale pan may be begun. The arrangement is such that the armature of the other transducer is the only one which can thereafter move with the scale device as weight is added to the product during the pumping process. When the amplitude and phase definition of the signal produced in the last mentioned transducer is compared with that of the locked transducer, because of the preset percentage differential in their respective signals a determination can be easily made as to the quantity of pickle which must be added.

In the preferred form of the invention the signals thus generated by the two transducers may be fed into a suitable amplifying and relay circuit means forming an automatic controller. The initial differential as between the signals produced in the two transducers upon first weighing the product, can be made to operate the relay devices after the pumping operation has been started, whereby to automatically control the pumping of pickle. The device can be set to terminate the pumping operation when a desired percentage of pickle with respect to the weight of the product has been added thereto.

The preferred form of invention is shown and described more fully in the drawings and specification below, wherein:

FIGURE 1 is a sectional assembly view partly broken away showing the preferred arrangement of a scale and its associated transducer means; and FIGURE 2 is a diagrammatic showing of the transducer and an electrical circuit for accomplishing the purposes of this invention.

Referring to the drawings, the scale includes a housing 9 which is shown in section and with the back wall thereof partly broken away, the scale having a suitable base 10. A fixed upright 11 is supported from the base and serves in turn to support a parallelogram linkage including horizontal arms 12 and 13 which are each pivotally joined at their respective ends to spaced points along the upright 11 and at their other ends to spaced points along the movable vertical support 14 for a scale pan 15. A suitable resilient beam 16 may also be fixedly supported at one end on the upright 11 to extend in a cantilever fashion outwardly therefrom between the links. The upper link 13 may be supported on the resilient beam by means of the knife edged spacer block 17 and the pivotal connection 17' between the scale pan support 14 and link 13 may also take the form of a knife edge bearing. It is seen that with this structure a simple scale mechanism is provided, wherein scale pan 15 is carried indirectly on the resilient beam 16 by means of knife edge bearing means and the parallelogram linkage which guides its motion as it moved up and down when more or less weight is applied thereto.

At the movable end of the resilient bar 16, means are provided to measure the degree of deflection thereof upon the addition of more or less weight to the scale pan and such means includes a "memory" device to retain the measure of the original deflection and a second device for giving an indication which may be varied a given percentage lower than that of the reading of the "memory" device.

A preferred means for accomplishing such a result may take the form of a pair of transducer members generally denoted 20 and 21, the armatures 22 and 23 of which may be hung one below the other from the free end of resilient beam 16. The armature 23 is suspended from a yoke 24 which surrounds bar 16 and has a knife edge bearing 24' on the top of beam 16. Armature 22 is preferably hung vertically below and in alignment with armature 23, the armature 22 being suspended from the lower end of rod 25 depending from armature 23. For this purpose rod 25 is formed like an inverted T one side of which is adapted to receive the hook shaped end of the upwardly extending rod 26 to provide a releasable hooked engagement for a purpose that will appear more fully below.

The coil elements 27 and 28 of transducers 20 and 21 respectively, are carried in a manner to be longitudinally adjustable jointly or separately along a fixed support 29 forming a part of the frame of the machine. For this purpose the coil elements are carried on a plate 30 which in turn is slidably mounted on fixed support 29. The plate 30 may be vertically adjusted along support 29 by means of adjusting screw 31 and the coils may each be individually adjusted relative to plate 30 by means of adjusting screws 32. The coils include primary and secondary windings as shown diagrammatically in FIGURE 2 and the transducers as thus arranged may be made to function in a well known manner to produce measurable variations in the amplitudes and phase definitions of the signals generated, dependent upon the position of the armatures 22 and 23 as they are displaced more or less from a given zero setting.

With the arrangement described above, adjusting means 31 and 32 are manipulated to produce a zero setting which corresponds to the no weight position of the scale and when the scale pan is moved from its zero weight position to another position such as when a product is placed in the pan 15, the beam 16 is caused to bend such that its outer end moves down a given amount depending upon the weight of the product. The armatures 22 and 23 both move a corresponding amount and the signals which are thus generated by each of the transducer means measure the degree of movement of the end of rod 16. The variation between the zero setting and the respective signals generated by each transducer are each directly proportional to the weight of the product placed in the scale pan. Thus one signal may be calibrated to be the equivalent of the weight of the product on the pan whereas the other signal may be different by a given percentage for example if a pickle fluid is to be added to a ham in the amount of 15% of the weight of the ham, the other signal generated in the other transducer might have 85% of the amplitude and phase definition of the first signal. The first signal may then be maintained while pickle is added to the ham and when the 15% by weight of pickle has been added, the second signal will have the same amplitude and phase definition as the first signal. To make possible this comparison of the signals, the armature 22 of the lower transducer 20 has a rod 35 depending from it which rod is adapted to cooperate with a selectively operable lock or holding means 36. As shown the lock 36 may take the form of a solenoid device wherein the core of the solenoid has an end of its armature 37 extending outwardly from the solenoid, the end having an aperture to receive rod 35 and in one position the aperture in the end of the armature 37 permits the rod 35 to reciprocate freely in the aperture but in another position, as when its coil is energized and the armature is shifted to the right referring to FIGURE 1, the wall of the aperture engages rod 35, further movement of rod 35 is precluded. The solenoid 36 may be fixedly carried on base 10 with the aperture in the armature 37 in substantial alignment with the normal vertical position of rod 35 when the solenoid is de-energized. When the armature 22 of transducer 20 is locked after the product has been weighed initially, transducer 20 is conditioned to retain the 100% signal.

This locking means precludes further movement of the armature of solenoid 20 and this group of elements thus constitutes the "memory" device. This is so because after the product has been weighed, the solenoid 36 is energized and armature 22 is locked against following the further movement of the end of beam 16 which is caused by adding pickle to the product. Therefore, the amplitude and phase definition of the signal generated by the initial movement of armature 22 as it follows beam 16 downwardly during the initial weighing step, may be calibrated to serve as a measure of the weight of the product and after the initial weight of the product has been established this reading of the weight is retained as long as armature 22 is held locked in place.

When armature 22 is locked against movement and as the pickle pumping operation proceeds, armature 23 continues to move downwardly and the hooked end of armature 22 remains stationary. Thus the weight of armature 22 and rod 35 are in effect removed from the end of beam 16 and to make up for this loss of weight, a selectively operable compensating weight 40 is carried from the frame of the machine on a lever 41. One end of the lever 41 is pivotally supported from any convenient portion of the frame, and the other end of the lever is provided with a seat 42 adapted to engage and rest upon the other side 43 of the T-shaped lower end of rod 25. The weight 40 is selected to be just sufficient to add a force to rod 25 to just balance the weight of armature 22 and its associated rods 26 and 35. The weight 40 may be selectively applied to add a downwardly directed force to rod 25 upon energizing of the magnet 44 as will be explained below which withdraws the spring pressed lifter element 44' from contact with the underside of bar 41 substantially simultaneously with but lagging slightly behind the energizing of solenoid 36 so that armature 22 is securely locked before weight 40 is applied to the system.

The scale mechanism has a pickle pumping means adapted to cooperate with it and as is well known a continuously running pump 45 may be driven by a suitable electric motor to force pickle fluid from a suitable supply through conduits to needles 46 situated in the product. Pickle fluid is delivered through the conduits to the ham when a suitable valve is opened by the actuation of solenoid 53 in a manner which will be described below.

Also a cam 47 may be provided for cooperating with the under side of link 13 to provide a positive support for scale pan 15 while the operator handles the product to connect the needles 46 to it. The operation of cam 47 may be either manual or it may be controlled automatically by use of a solenoid 48. The cam 47 is moved into its supporting position upon termination of the pickle pumping operation and remains in this position until the product is prepared for the starting of the weighing and pickle pumping operation.

The transducers 20 and 21 may be connected into an electrical circuit in a known manner as shown in FIGURE 2 with their primary coils in series aiding relation and their secondary coils in series bucking relation, whereby the signal generated in each transducer follows a substantially straight line relation with respect to the movement of their respective armatures. For the purposes of this invention, in order to produce a predetermined proportional variation in all ranges between the signals produced by the respective transducers, a resistance may be connected in parallel with the secondary coils of one of the transducers and it has been found that the straight line relation between the amplitude of the signal generated in that transducer with respect to the movement of its armature is displaced a given percentage from the reading of the other transducer throughout the normal range of the signals generated by both transducers.

As here shown the bottom transducer 20 is operated in a manner to form the memory device while the upper transducer 21 is provided with a resistance circuit in parallel with its secondary coils as shown in FIGURE 2 to vary the amplitude of the signal it generates. In this circuitry, the resistance functions to reduce the amplitude of the signal generated a given percentage below that of the other transducer upon equal movement of their respective armatures. The degree or percent of variation is controlled by adjusting the resistance so that the amplitude of the signal of the transducer 21 will always be a determined percentage lower than the amplitude of the signal generated in the other transducer 20 throughout all portions of the operative range of their movement. As shown in FIGURE 2, the variable resistance 50 may be connected in parallel with the secondary coils of transducer 21 so that any one of a selected range of percentage variations can be produced between the signals resulting from moving the armatures of transducers 20 and 21 the same distance, or if desired, a series of fixed preselected resistances can be provided, which may be connected into the circuit at will to get any one of a number of preselected percentage variations as between the respective transducer signals during the initial weighing operation.

The transducers may be conditioned for operation in a known manner and connected to cooperate with a suitable amplifying means 52 and control circuit that are preferably enclosed within casing 9. The signals generated in the transducers may be fed into the amplifier means 52 to cooperate with the control circuit in a manner to make the pickle pumping cycle fully automatic.

The several solenoid means described above are energized in a desired sequence to complete the cycle and may be connected into a circuit such as is shown in FIGURE 2 to be energized from the amplifier means 52. The amplifying means receives current from lines L1 and L2 when switch 55 is closed and the transducers are simultaneously rendered operative.

The scale is prepared for use after the transducers and amplifying circuits are rendered operative and the transducers may be checked for a zero reading with the scale pan empty. The product may then be prepared for pumping and placed on scale pan 15 which may be held stationary if desired by cam 47 engaging under link 13. When the pumping cycle is ready to start, the switch 56 is closed so that current flows from L1 through conductor 70 to the switch 56, to conductor 71 to energize solenoid 48 to retract cam 47 from under link 13. The weight of the product on the scale pan is then transmitted to the bar 16 through knife edged spacer block 17 and as the beam 16 deflects, the transducers are moved from their zero setting and each transducer becomes operative to transmit its signal to the amplifying circuit 52. Since one of the signals generated is a desired percentage different than the other, as soon as the unbalanced signals are fed to the amplifier, the solenoid 57 is activated to close the contact 57'. When switch 57' is closed, a circuit is completed from L1 to conductor 70, switch 56, conductor 71, switch 57' to conductor 58, to holding relay 59 which becomes operative to close switches 56' and 60. In view of the sensitivity of the transducer and amplifier means, the solenoid 57 is activated when only an ounce or two is registered on the scale device so that the closing of switch 56, the operation of solenoid 48, the activation of solenoid 57 and its switch 57' for completion of the circuit through the holding relay 59 are all accomplished in short order and switch 56 need be held closed only for a second or so to start the automatic pumping cycle. In a commercial form of amplifier means the solenoid 57 and switch 57' may be enclosed in the casing for the amplifier 52.

Switch 56' remains closed as long as relay 59 is energized but as will be explained below, both switches 56' and 60 are opened when the current flow through relay 59 is interrupted. When switch 60 is closed current flows from L1 through conductor 70 through switch 60 to conductor 72 to a time delay relay device 73 associated with contacts 74, the time delay relay finally functioning to let current flow through relay 73 to conductor 62 to L2. The delay in the operation of relay 73 may be as long as 5 seconds or so after the closing of switch 60 and then relay 73 functions to close switch 74 to complete a circuit from conductor 70 through conductor 74' to switch 74 to conductor 75 to solenoid 36 to conductor 62 to L2 to energize the locking solenoid 36 for the memory device. Upon the closing of switch 74 current also flows to conductor 76 to solenoid 53 to conductor 62 and to L2 to open the valve controlling the flow of pickle from the pump to the ham. In the preferred design, closing of switch 74 also feeds current to conductor 80 through time delay solenoid 81 which closes switch 81', then current flows through conductor 77 to switch 81' to solenoid 44 to conductor 62 to L2 to energize solenoid 44 to withdraw support 44' from under the weight compensating lever 41. The time delay relay 73, is set to allow a time interval to transpire which will be sufficiently long to complete the initial weighing operation. As suggested above, a 5 second interval may be sufficient with the mechanism here shown, but a shorter or longer period can be provided depending upon the characteristics of the scale with which this control means is used.

Once the circuits have been established as above described, the pickle flow valve will remain open and pickle will flow into the product on the scale until solenoid 59 is de-energized. This is accomplished automatically and under the control of the transducer means 20 and 21. After the control circuit has been set in operation and the cam 47 is retracted from under link 13, beam 16 is deflected a given distance depending upon the initial weight of the product and this deflection is measured by the signal generated by the lower transducer 20. Then upon closing of contact 74 of the time delay relay 73 the solenoid 36 is energized to hold the armature of transducer 20 stationary to form the memory device so that thereafter the signal generated by this transducer remains constant at whatever amplitude it registered when the armature is locked against further movement. The compensating weight 40 is then applied to the rod 25 as explained above after the memory device has been locked in place, and as pickle is added to the product on the scale pan, the armature 23 of transducer 21 may move downwardly as the weight on the pan increases due to the pumping of the pickle into the product so that the signal generated by transducer 21 is now responsive to and is produced by the weight of the product in the scale pan plus the weight of the pickle which is pumped into it. The compensating weight 40 removes any error that might otherwise be present when the weight of the armature 22 and its associated rod 26 and 35 are removed from rod 25 after the memory device is locked in during the pumping cycle and thus a means is provided to accomplish a very accurate and undistorted continuation of the generation of a signal in transducer 21. It is important that compensating weight 40 be applied to seat 43 only after the armature of transducer 20 has been locked and the solenoids 36 and 44 and their associate springs are selected to accomplish this result. As above stated a time delay such as relay 81 may be used to ensure this result. The signal generated in transducer 21 is continuously compared with the signal generated in the locked memory device transducer 20 by means of the amplifying device 52 during the pickle pumping cycle, and when the weight of pickle added to the product moves armature 23 a distance which causes the signal generated in transducer 21 to match the signal generated in the locked transducer 20, the amplifier 52 is operative to open relay 57.

When the contact 57' of relay 57 is opened, the current supply to the coil of relay 59 is opened and relay 59 is de-energized whereupon switches 56' and 60 are opened. When this happens the self holding action of relay 59 is broken and when switch 60 is opened, relay 73 is de-energized and the pickle pumping cycle is ended. When both manually operable switch 56 and contacts 56' are opened, solenoid 48 is de-energized to permit a spring to drive cam 47 under link 13, solenoid 36 is de-energized to release the locking means for the memory device whereupon the transducer armatures may return to their original position, the solenoid 53 is de-energized to close the valve in the pickle flow line, and solenoid 44 is de-energized whereby lift 44' is resiliently urged upwardly under lever 41 to lift the seat 42 off of seat 43 on rod 25 to remove the effect of the compensating weight from the transducer system. All of these actions take place substantially simultaneously upon the opening of contact 57'.

In this manner the pickle pumping operation is automatically discontinued as soon as the predetermined or pre-set percentage difference initially established between the signals generated in the two transducers, has been made up. Regardless of the initial weight of the original product the proportionate weight of the pickle pumped into it is automatically determined and the pumping operation is terminated automatically whereupon the needles may be removed from the product and a fresh product placed in the pan to be pumped. The cam 47 of course protects the delicate parts of the instrument from any undue movement at this time and as soon as the fresh product has the pumping needles inserted in it, the apparatus is already conditioned for a repetition of the cycle described above, all that need be done is to momentarily press switch 56 to actuate the solenoid 48 to withdraw cam 47 and establish a circuit through the holding relay 59. The operation of the mechanism is fully automatic thereafter.

The pre-setting of the signals generated in the two transducer means 20 and 21 in relative proportion to each other is accomplished by adjusting the variable resistance 50. It is apparent that if several standard proportional readings are frequently made use of, that a series of fixed resistances or increments of resistance could be added in the circuit by operating a suitable switch.

As described above, the transducers 20 and 21 have been shown disposed one under the other. It is apparent that since resilient arm 16 is fixed at one end and free at the other, that at different distances from the center point, the arm moves through distances that are always proportional. Thus the two transducers 20 and 21 might be rendered operative in the manner described above by placing them different distances outwardly along the bending arm. By selecting the proper relative points for hanging the transducers the desired percentage relationships could be established and appropriate signals fed into the amplifying means to effect operation of the control circuits.

While the description given above has included an example of the use of this invention in the pumping of a ham product, it is obvious that it will find application wherever proportional weighing operations are made use of. It is suggested also that this tarnsducer mechanism, including the memory device principle, can be utilized wherever proportional movements are to be controlled dependent upon an initial movement. Such utilization would require only the use of obvious mechanical movements to transmit the motions to be measured to the transducer system coupled with suitable amplifier and solenoid means actuated by a control circuit responsive to the signals generated in the transducers. If need be, more than two transducers could be utilized to control the proportional movement of more than two elements relative to the basic motion as recorded in the memory device, obvious circuitry and mechanical means can be devised for this purpose.

It is suggested also that modifications of this device may be made to serve wherever a proportional comparison of movement within a defined path is desired. Thus a control mechanism can be visualized where a follower may be made to move a given distance relative to or proportional to the movement of a driver, by means of a "memory" device connected to the driver and a proportional reading transducer which follows the movement of the follower device.

The above description therefore is intended to exemplify only the preferred form of this invention and many modifications thereof will occur to those skilled in the art which will fall within the scope of the following claim.

I claim:

A meat pumping scale having a pickle pumping means associated therewith and a movable weighing beam for weighing the meat, comprising a pair of transducers having armatures vertically aligned and movably responsive to the motion of said beam, said armatures being of light weight and having a releasable interconnection, said transducers having coils, means to produce a given percentage difference in the signal generated in the coil of one of the transducers with respect to the signal generated in the coil of the other transducer for the same degree of movement, means for connecting said pickle pump to the meat so that the pickle can be delivered thereto, an amplifying circuit to receive and compare the signal output of each of said transducers, means operative after the weight of the meat to be pumped has been established to hold the armature of the lowermost transducer fixed against the driving action of said beam whereby to hold the signal generated in that transducer, means to simultaneously add a weight to the uppermost armature equal to the weight of the releasable lowermost armature, means to thereafter activate the pickle pumping means so that pickle is added to said meat, said amplifying means including means to compare the signal generated by movement of the armature of the other transducer as the pickle is added with the fixed signal of the lowermost transducer, and means responsive to said signal comparison to inactivate said pickle pumping means when the percentage difference with respect to the signal generated in the other transducer and the fixed signal has been made up whereby a known percentage by weight of pickle may be added to the meat.

References Cited in the file of this patent

UNITED STATES PATENTS

| | | |
|---|---|---|
| 2,088,257 | Beisser | July 27, 1937 |
| 2,728,285 | Bradley et al. | Dec. 27, 1955 |